United States Patent [19]

Larson et al.

[11] 4,205,814
[45] Jun. 3, 1980

[54] MACH HOLD CONTROL CIRCUIT FOR AUTOTHROTTLE SYSTEM

[75] Inventors: Warren R. Larson; Leonard P. Stephan, both of Seattle, Wash.

[73] Assignee: The Boeing Company, Seattle, Wash.

[21] Appl. No.: 931,582

[22] Filed: Aug. 7, 1978

[51] Int. Cl.² ............................................. G05D 1/08
[52] U.S. Cl. ................................... 244/182; 364/431
[58] Field of Search .............. 73/178 R; 244/180–182, 244/188; 340/27 SS; 364/431, 433–435, 440, 442

[56] References Cited

U.S. PATENT DOCUMENTS

| | | | |
|---|---|---|---|
| 2,950,075 | 8/1960 | Owen | 244/182 |
| 3,901,466 | 8/1975 | Lambregts | 364/431 X |

Primary Examiner—Trygve M. Blix
Assistant Examiner—Reinhard J. Eisenzopf
Attorney, Agent, or Firm—Conrad O. Gardner; B. A. Donahue

[57] ABSTRACT

A Mach hold control circuit for an aircraft autothrottle system provides capture of a Mach number and control thereto while providing a low level of throttle activity also stabilizing the aircraft at maximum range cruise (MRC) Mach numbers and above. The Mach hold control law utilizes a Mach error signal, flight path acceleration signal, average engine EPR signal, and associated logic inputs and when interfaced with the autothrottle system provides a throttle rate command to the aircraft engines via. the throttle and engine control system thereby modulating engine thrust to provide control to desired flight Mach number.

3 Claims, 6 Drawing Figures

MACH HOLD CONTROL CIRCUIT FOR AUTOTHROTTLE SYSTEM

This invention relates to aircraft autothrottle systems and more particularly to autothrottle systems having full flight regime capability.

Jet powered aircraft at cruise altitudes and cruise Mach numbers exhibit a marginal speed stability characteristic. This condition tends to deteriorate when flown at or below speeds corresponding to the most fuel efficient speed, commonly referred to as maximum range cruise Mach number, or MRC. Flight crews encounter increased difficulty when trying to control to this condition. As a consequence aircraft are flown at speeds higher than MRC where cruise efficiency becomes degraded but the aircraft is more speed stable and becomes an easier control task for the pilot.

It is accordingly an object of this invention to provide Mach hold control for allowing the aircraft to capture and control to a Mach number with a low level of throttle movement further providing with EPR control and speed control, an autothrottle system having an operational full flight regime capability.

It is a further object of this invention to provide Mach hold control which provides a cruise mode by commanding engine EPR changes and aircraft accelerations proportional to Mach number deviations from a trimmed condition, together with EPR control utilized during takeoff and climb, and speed control utilized during descent, hold, and approach in an autothrottle system thereby providing full flight regime capability.

It is another object of this invention to provide a Mach hold control circuit in an autothrottle control system having a cruise mode for providing aircraft capture and control to a desired Mach number while minimizing throttle activity.

In accordance with a preferred embodiment of the invention an autothrottle system includes a Mach hold control circuit for allowing the aircraft to capture a predetermined Mach number and control thereto with minimum throttle activity, the autothrottle system thereby providing improved fuel economy, reduced engine wear, reduced flight crew workload, over engine EPR protection and protection against slowing down to an unstable speed condition.

Other objects, features, and advantages of the present invention will become apparent from the following description read on the accompanying drawings, wherein.

Figure 1:
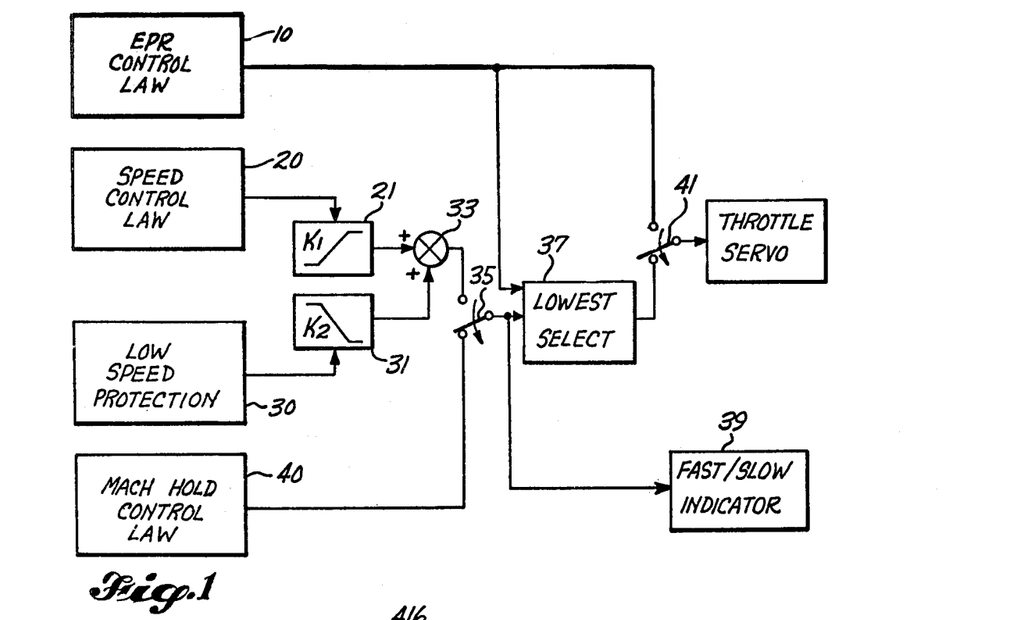
FIG. 1 is a block diagram illustrative of the present full flight regime autothrottle system.

Proceeding initially with a general discussion of the system of FIG. 1, it should be noted that the Mach hold control 40 (shown and described in detail hereinafter in connection with FIG. 2) interface with the present autothrottle system is shown in FIG. 1, and that the resulting control output to the aircraft is a throttle rate command to the engines via the throttle and engine control system. This control modulates the engine thrust which in turn controls the desired flight Mach number.

Mach hold control law 40 (as seen more clearly from FIG. 2) utilizes a Mach error signal, a flight path acceleration signal and an average engine EPR signal and also associated logic inputs. The Mach error signal is proportional to the Mach number deviation from the control Mach number. The flight path acceleration signal is obtained from an aircraft longitudinal signal that is compensated for aircraft pitching motions and for air mass shear. The average EPR signal is the average engine pressure ratio of all of the aircraft engines. For aircraft equipped with non-EPR rated engines, the engine rating parameter, such as N1, can be substituted for EPR. The purpose of Mach hold control circuit 40 is to capture a Mach number when the system is engaged and control the aircraft to this Mach number during cruise flight conditions. Alternatively it can capture and control to a Mach number from an alternate source such as a performance data computer that is programmed for MRC Mach numbers.

Figure 1A:
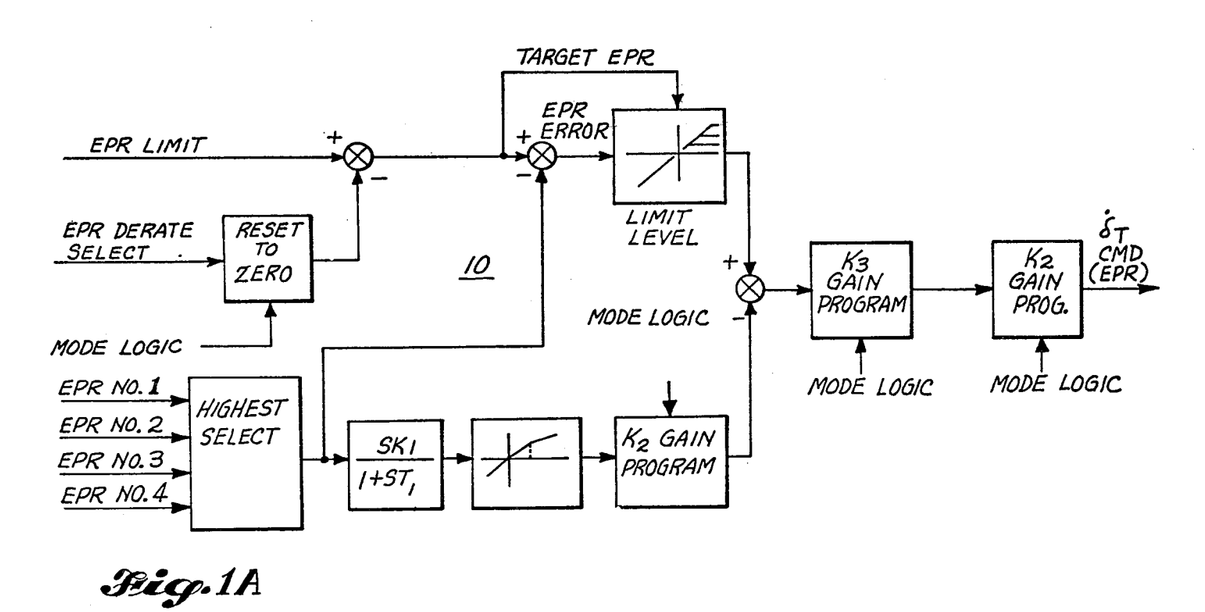
FIG. 1A is a schematic diagram of the EPR control mode utilized in the system of FIG. 1.
Figure 1B:
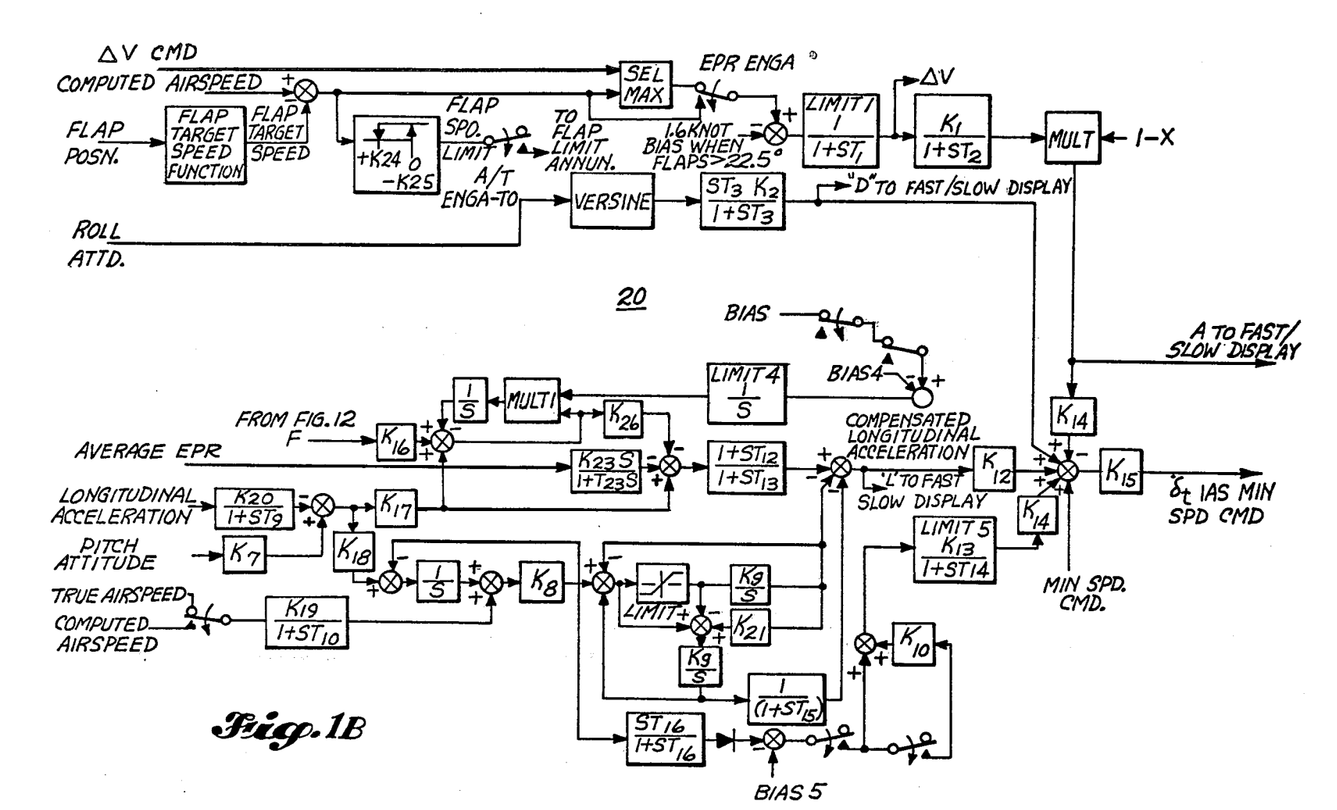
FIG. 1B is a schematic diagram of the speed control mode utilized in the system of FIG. 1.
Figure 1C:
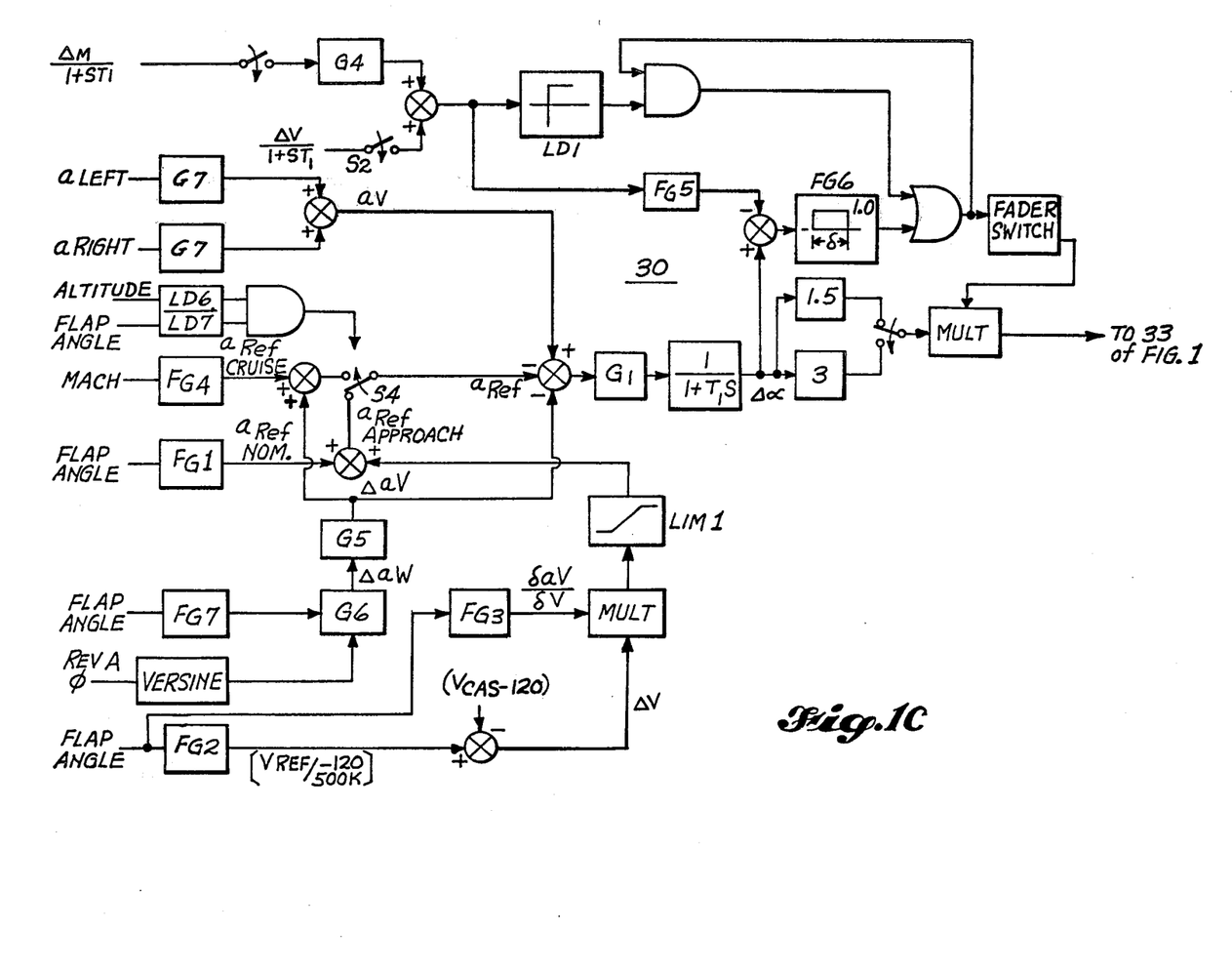
FIG. 1C is a schematic diagram of the low speed protection control shown in the system of FIG. 1.

Low speed protection circuit 30 (a detailed schematic diagram of which is shown in FIG. 1C) monitors aircraft angle of attack and Mach number. This data is compared to reference values that are based upon the Mach number that is below the aircraft hold speed. Mach numbers below this region are in an area often referred to as the "backside of the power curve." The purpose of this protection system is to prevent the aircraft from getting into this region. When the aircraft approaches this condition, the control of the autothrottle system will switch to low speed protection control law 30 through a transient free phasing switch. The autothrottle will remain in this mode until the Mach number has recovered to a safe value at which time control will revert back to Mach hold control law 40 through the phasing switch.

The present full flight regime autothrottle system shown in FIG. 1 is unique in that a Mach hold mode for cruise flight is provided together with speed and EPR control modes. In addition to the aforementioned primary control modes, low speed protection and engine EPR override protection are provided in the present system. The manner of interfacing of these modes is seen from FIG. 1. Speed control circuit 20 and low speed protection 30 are coupled respectively through first 21 and second 31 time variable gain functions K1 and K2, and summed together at summing means 33. These gain functions allow transient-free switching between these control laws. The output of summing means 33 together with Mach hold control law 40 is coupled through switching means 35 to lowest select circuit 37. Switching means 35 remains in the relaxed (false) position when speed mode 20 is selected or when low speed protection 30 is active. When Mach mode 40 is selected and low speed protection 30 is not active, switching means 35 will switch to the true position (as shown in FIG. 1). The output signal from switching means 35 is then compared with the output from EPR control law circuit 10 in lowest select circuit 37. Lowest select circuit 37 provides then the engine EPR override protection. The output signal from switching means 35 also is coupled to FAST/SLOW indicator display means 39 (located in the aircraft cockpit) to provide the crew with an indication of the aircraft speed relative to that commanded by the autothrottle system. When EPR mode 10 is selected, switching means 41 will return (from the position shown in FIG. 1) to the relaxed (false) state. When the EPR mode is not selected, switching means 41 will be in the true position as shown in FIG. 1.

Before proceeding to a detailed discussion of Mach hold control circuit 40 detailed in FIG. 2, the functions of EPR control circuit 10, speed control 20 and low speed protection 30 as seen respectively in the circuits of FIGS. 1A, B and C will be further noted in the following:

EPR Control Circuit 10

The EPR control law 10 implemented in the circuit of FIG. 1A commands (when the system of FIG. 1 is in the EPR control mode) the throttle levers to acquire and maintain the engine EPR of the engine producing the highest EPR to a value equal to the EPR limit of the selected EPR limit mode minus any increment of decreased EPR limit selected (0.01, 0.02, 0.03, 0.04, 0.05, or 0.06). The comparison of all four engine EPR's and the selection of the highest EPR is a continuous function within the autothrottle computer. The EPR limit signal is developed in the TAT/EPRL (total air temperature/engine pressure ratio limit) system and the EPR command error signal input of FIG. 1A is developed in the autothrottle computer.

Speed Control Circuit 20

Speed control implemented as shown in the circuit of FIG. 1B commands in the autothrottle system of FIG. 1 (when the system of FIG. 1 is in the speed control mode) the throttle levers to acquire and maintain the airspeed commanded. The airspeed is selectable from 100 KTS to 400 KTS with the airspeed error signal developed in the captain's airspeed indicator. The desired airspeed is set by a dial located on the autopilot-flight director mode select panel. The difference between this selected speed and the actual indicated airspeed is the airspeed error signal.

Low Speed Protection Circuit 30

The control law for low speed protection implemented in the circuit of FIG. 1C employs a throttle command proportional to incidence error ($\Delta\alpha$). The error path includes a smoothing lag to minimize sensor and high frequency aerodynamic noise. The function of the changeover logic is to decide if it is desirable to control the aircraft from the Mach or airspeed error signals, if it is not desirable a rapid or smooth change is made to the control law employing incidence error relative to a stored incidence reference. The incidence signal is obtained from computing the average output of two incidence vanes, one on each side of the aircraft. The performance of the control loop with incidence control has very similar characteristics to that achieved with airspeed control, hence not only is the minimum speed protection system suitable as a back-up but also can be considered as a control mode in its own right.

Figure 2:
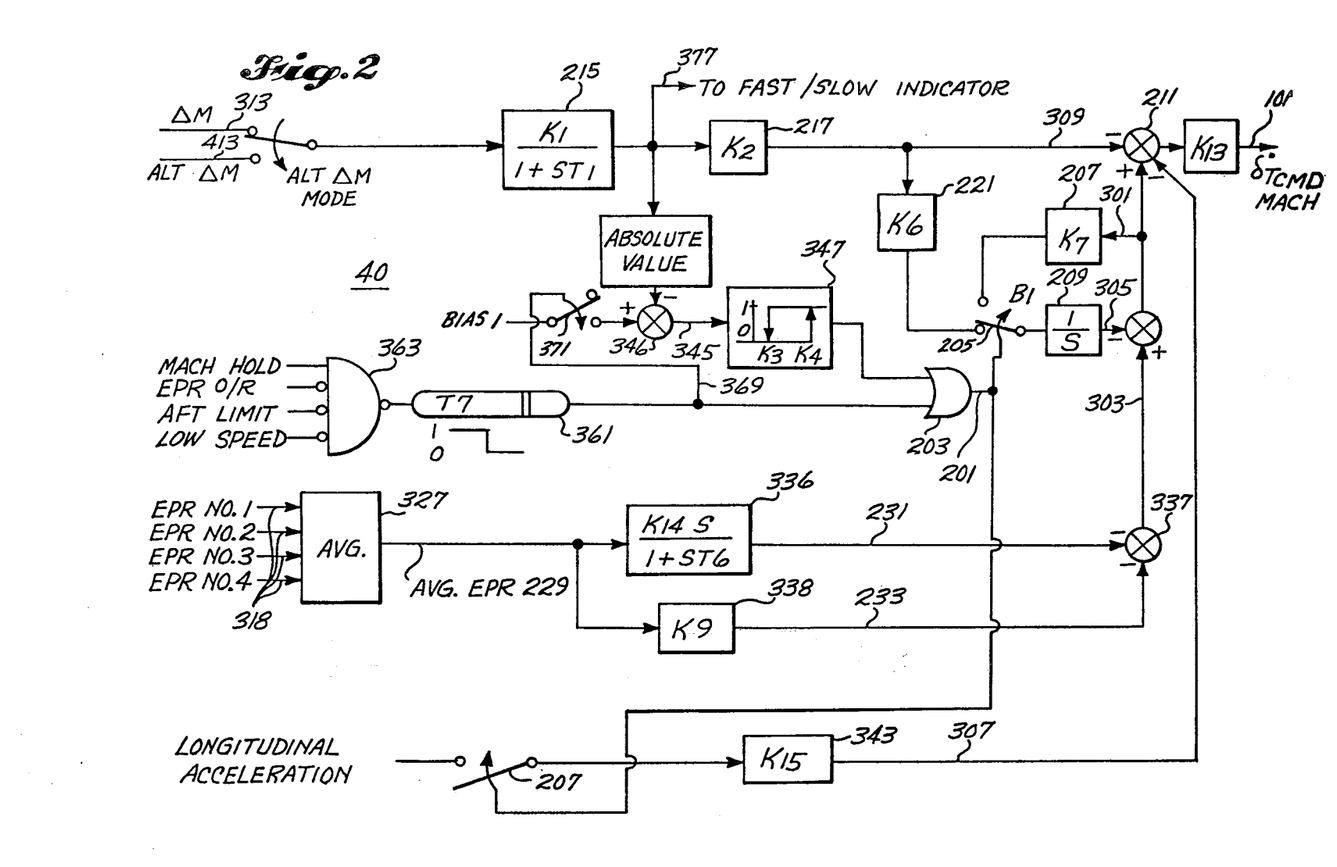
FIG. 2 is a schematic diagram of Mach hold control utilized in the system of FIG. 1.

As hereinbefore noted, when the circuit of FIG. 2 is connected to the circuit of FIG. 3, via lead 101, a complete circuit implementation of the Mach hold control law is provided and in the following a complete understanding is believed will be gleaned of the Mach mode of autothrottle operation:

Mach Capture

When the autothrottle is initially engaged in Mach mode, either from an autothrottle off condition or from some other mode, it will automatically be in the Mach capture submode. While in this submode, logic output signal 201 will be in a true state, e.g. a 1 or high level output signal from OR gate 203 forcing switch 205 and switch 207 in the directions of the arrowhead (to true positions). When switch 205 is in a true state, signal 301 is forced to a zero value through a synchronizer gain of K7(1/S) provided by gain circuit 207 and integrator circuit 209. This synchronizer circuit blocks EPR signals 303 from getting through forcing output signal 305 of integrator circuit 209 to continually track EPR signals 303.

Figure 3:
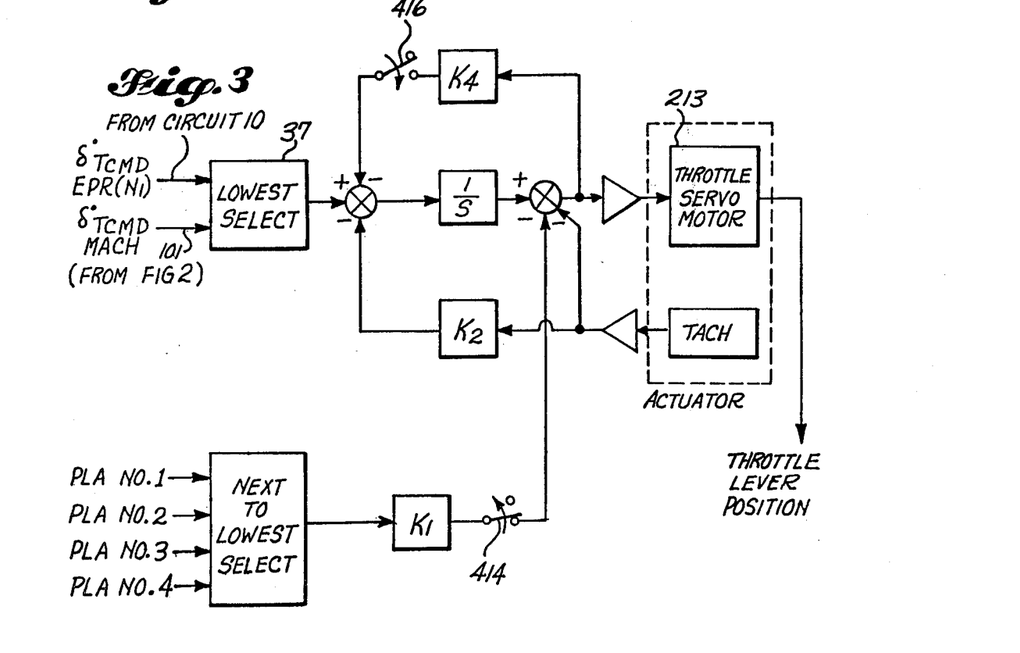
FIG. 3 when connected to FIG. 2 is illustrative of the power lever angle (PLA) feedback arrangement in the throttle servo upon Mach mode engagement of the system of FIG. 1.

When switch 207 is in a true state, longitudinal acceleration signal 307 is summed at combining circuit means 211 with Mach error signal 309 resulting in a throttle command signal on lead 101 which is coupled through to throttle servo 213 as seen in FIG. 3. When the system is satisfied the throttle command signal on lead 101 will approach a zero value. Mach error signal 309 at the input of combining circuit 211 is provided from Mach error signal 313 by series coupling through noise filter 215 and gain circuit 217, Mach error being the difference between aircraft Mach number when the Mach mode is engaged and the aircraft Mach number at any time. The object of this Mach capture submode is to force Mach error signal 313 to zero. When this occurs, the aircraft should be in a trimmed engine thrust condition with zero aircraft acceleration. This is achieved by commanding an aircraft acceleration that is proportional to Mach error signal 309.

Mach Track

When logic output signal 201 is false, the Mach mode will be in the Mach track submode. This is the normal state for the Mach mode and it will operate in this submode for the majority of the time. It is the object of this submode to control the aircraft to a low value of Mach error with a low level of throttle activity. When logic output signal 201 is false, switches 205 and 207 will be in the relaxed position as shown in FIG. 2. The nature of Mach error signal 309 will be the same in this submode as it was in the hereinbefore described Mach capture submode. When switch 205 goes to the false state, signal 301 will be zero and then commence to reflect changes in signals 303 and 305. Signal 305 will be initially equal to signal 303 and will then change to reflect the integral of signal 309 times the gain K6 of gain circuit 221. This integral path allows the system to eliminate any signal offsets and allows the aircraft thrust to be trimmed at a constant Mach number as fuel is burned off, altitude is adjusted or atmospheric characteristics change.

The value of signal 303 changes continually as the engine EPR signals 318 change. The EPR signal is known as the engine pressure ratio, ($PT_7/PT_1$) and changes value when engine thrust changes. The engine EPR signals 318 are averaged in averaging circuit 327 to provide average EPR signal 229 to reduct the effect of engine performance differences. Signal 231 reflects the rate of change with time of average EPR signal 229 and is provided by coupling average EPR signal 229 through washout and gain circuit 336. Signal 303 is then provided by summing at combining circuit 337, signal 231 and signal 233. Signal 233 is provided by coupling average EPR signal 229 through gain circuit 338 and is proportional to average engine EPR multiplied by gain K9. When switch 207 is in the false state (relaxed condition as shown in FIG. 2) then signal 307 (which is longitudinal acceleration multiplied in gain circuit 343 by gain K15) goes to zero. Because this signal 307 is small when switch 207 opens by virtue of the capture/track logic, any resulting transient on signal 307 will be small and will have a negligible effect on command signal at lead 101 to autothrottle.

Alternate Mach Mode

The alternate Mach mode allows the Mach hold to accept a Mach error signal other than that based upon the engage Mach number signal 313. This alternate Mach error signal 413 can have a continually changing reference value. It is the intent of this mode to provide for acceptance of a Mach error signal from a performance data computer, a pilot command or other source. The performance of the aforementioned Mach track and capture submodes are not changed by the selection of the alternate Mach mode.

Capture/Track Logic

The capture/track logic is shown in FIG. 2 and is necessary for the operation of the Mach mode. The intent of the logic is to force the Mach mode in the capture submode upon initial engagement. When the aircraft stabilizes at the engage Mach number, or command Mach number if the alternate Mach mode is selected, this logic will allow an automatic switching to the Mach track submode. When logic output signal 201 from OR logic gate 203 is true, the capture submode is active. When logic output signal 201 is false the track submode is active.

Logic output signal 201 is always true when Mach mode is initially selected by virtue of time delay circuit 361 (providing a time delay T7 of e.g. 20 seconds) coupled downstream from AND logic gate 363 and will stay true for T7 seconds. The same sequence in logic output signal 201 will occur when the autothrottle is engaged in Mach mode AND the autothrottle comes out of EPR override, the throttles come off of the aft limit, OR the autothrottle comes out of the minimum speed mode.

Logic output signal 201 will also be true under certain flight conditions and force the system to the capture submode. This will occur when signal output 345 from combining circuit 346 exceeds a value equal to K4.

Signal 345 is formed by adding the absolute value of signal 377 to Bias 1 when logic output signal 369 is true. The absolute value of signal 377 is used to force the logic to operate symmetrically for a positive and negative Mach error. The value of Bias 1 is chosen to force signal 345 to always exceed K4 when logic signal 369 is true. Logic output signal 201 will remain true until signal 345 drops below a value of K3. This level switching provided by hysteresis circuit 347 forces the Mach mode to the capture submode whenever the filtered Mach error exceeds a predetermined value. This value is based upon a level of Mach tracking performance that is acceptable for the aircraft and flight condition. The lower level of the switch (K3 of hysteresis circuit 347) is set close to a zero value to allow the Mach mode to switch to the track submode gracefully. Logic output signal 369 and switch 371 are intended to force signal 345 above upper value gain K4 (of hysteresis circuit 347) upon initial Mach hold engagement. This is to insure that the system stays in the capture submode following initial engagement, until signal 345 drops below a value of K3.

Fast/Slow Mach Number Display

The fast/slow display (not shown in FIG. 2 but shown in FIG. 1) coupled to fast/slow indicator signal lead 377 will indicate to the flight crew if the aircraft is flying fast or slow relative to the control Mach number. The cockpit display consists of a horizontal moving bar over a calibrated background. Whenever the bar is above the zero reference, the aircraft is flying fast relative to the control Mach number. Conversely the aircraft is flying slow when the bar is below the zero reference. The signal on lead 377 is used to drive the fast/slow display. This signal is the filtered Mach error 313 or alternate Mach error 413 signal times a gain K1. This signal is adjusted by an additional gain and filter to make it compatible with the display drive.

Engine Power Lever Angle Feedback

The power lever angle (PLA) feedback arrangement in the throttle servo when Mach mode is engaged is shown in FIG. 3. This configuration eliminates some of the effects of control system lost motion affects inherent in mechanical control system designs. The control system lost motion affects of interest here are those between throttle servo motor 213 and engine PLA. From FIG. 3 it can be seen that the next from lowest PLA value is selected and used in the throttle servo control when Mach mode is selected. When the Mach mode is engaged, switch 414 is closed and switch 416 is momentarily closed to allow the synchronization loop to run. This eliminates throttle transients upon Mach mode engagement and allows for precise control of the PLA to the throttle command from the Mach hold control law.

Engine EPR Override

When the autothrottle is engaged in the Mach mode, the command from the Mach hold control law is compared to the command from the EPR control law. As shown in FIG. 3 the lowest of these two signals is selected by lowest select circuit 37 and becomes the active command to the throttle servo. This means that whenever the Mach control law commands a more forward throttle command than the EPR control law, the EPR command will control the highest engine EPR to the EPR limit, thus preventing a continuous engine overboost. This lowest select mechanization also allows for transient free switching between the Mach and EPR control laws.

Low Speed Protection

When the autothrottle is engaged in the Mach mode, the low speed protection control law 30 shown in FIG. 1 (circuit detailed in FIG. 1c) prevents the aircraft from slowing down to unsafe air speeds. Since this speed is a function of aircraft gross weight and altitude, this speed is monitored in the autothrottle as a function of angle attack vane angle and Mach number. Whenever the aircraft slows to a speed where the vane angle reference exceeds the referenced vane angle, the autothrottle will revert to the low speed control law. This control law will prevent the aircraft from slowing down further. The autothrottle will remain in this mode until the speed recovers above the reference and then it will revert back to the Mach capture submode. The switching between low speed and Mach mode is through transient free phasing switches as hereinbefore described in regard to the description of FIG. 1.

In summary, from the preceding it is believed that included among the several unique features of Mach hold control will be found the following:

I. Mach Capture, a submode which forces the aircraft Mach number to recover to the engage Mach number reference following system engagement during accelerated flight or an external disturbance that results in a large deviation in Mach number.

II. Mach Track, which when certain conditions are satisfied will result in system switching to this submode from the capture submode thereby allowing the system to control to the engage Mach number with a low level of throttle activity.

III. Alternate ΔM mode, a feature which allows the present system to accept a Mach error signal from an alternate source. This signal could be computed from a pilot selected value or a performance data computer that is programmed to calculate optimum Mach numbers. The alternate Mach error will be the control signal for the Mach capture and track submodes.

IV. In FIG. 2, the alternate ΔM signal 413 can be replaced with a speed error signal to provide an alternate speed mode for cruise flight conditions. This speed error signal can have a continually changing reference value and may be obtained from a performance data computer, a pilot command or other source. The hereinbefore described features of the Mach track and capture submodes are not changed upon selection of the alternate speed mode.

V. The capture/track logic feature allows for an automatic transient free transfer of control between the track and capture submodes. This logic considers among other parameters, the Mach number deviation from the control point and time in capture submode.

VI. Fast/Slow Mach number display provisions allow the flight crew to monitor the Mach number discrepancy between the control Mach number and the actual aircraft Mach number. This display utilizes a horizontal moving bar over a calibrated background.

VII. The Engine Power Lever Angle Feedback feature allows the system to more precisely command a throttle position to eliminate some of the mechanical lost motion effects in the engine throttle control system. This improves the ability of the system to control to the desired Mach numbers.

VIII. As to Engine EPR Override, the Mach mode control will be replaced by the EPR control law whenever there is a danger of the engine EPR exceeding its EPR limits. This unique feature is implemented with a lowest select circuit between the Mach mode and the EPR mode command to the throttles. This allows transient free switching between Mach and the EPR protection mode. The highest engine EPR is used in the EPR protection mode.

IX. The low speed protection feature will prevent the aircraft from slowing down on a steady basis below the Mach number corresponding to the holding speed. Aircraft Mach number and angle of attack signals are utilized to determine the switching point. The actual switching is time dependent to eliminate control input transients.

We claim:

1. A Mach hold control circuit having capture and track submodes of operation and including an output terminal for providing a throttle rate command signal to a throttle servo in an aircraft autothrottle system, said Mach hold circuit comprising:

first means for providing a signal representative of Mach error;
second means for providing a signal representative of average EPR;
third means for providing a signal representative of longitudinal acceleration of the aircraft;
amplifier circuit means connected to said output terminal; said amplifier means having an input terminal;
combining circuit means coupled between said first, second and third means and said amplifier circuit means; and,
a logic circuit connected in circuit upstream from said combining circuit means for providing switching of said Mach hold control circuit between said capture and track submodes.

2. A Mach hold control circuit for providing a throttle command signal for use in an aircraft autothrottle system comprising:

means for providing a signal representative of Mach error;
first combining circuit means having first, second, and third input terminals and an output terminal;
first filter circuit means and first amplifier circuit means coupled in series circuit between said means for providing a signal representative of Mach error and said first input terminal of said first combining circuit means;
an AND gate responsive to signals representative of Mach hold, EPR override, aft limit, and low speed, said AND gate having an output terminal;
an OR gate having first and second input terminals, and an output terminal;
a time delay circuit coupled between said output terminal of said AND gate and said first input terminal of said OR gate;
second combining circuit means having first and second input terminals and an output terminal;
gain changing circuit means coupled between said output terminal of said second combining circuit means and said second input terminal of said OR gate;
an absolute value circuit coupled between said first filter circuit means and said first amplifier circuit means and said first input terminal of said second combining circuit means.
a bias source and first switching means coupled in series circuit path to said second input terminal of said second combining circuit means;
means for energizing said first switching means coupled between said time delay circuit and said first input terminal of said OR gate;
averaging circuit means responsive to the EPR of a plurality of aircraft engines for providing a signal representative of average engine EPR;
third combining circuit means having first and second input terminals and an output terminal;
washout and gain circuit means coupled between said averaging circuit means and said first input terminal of said third combining circuit means;
second amplifier circuit means coupled between said averaging circuit means and said washout and gain circuit means and said second input terminal of said third combining circuit means;
fourth combining circuit means having first and second input terminals and an output terminal, said output terminal coupled to said second input terminal of said first combining circuit means;

second switching means and third amplifier circuit means coupled between a source of signals representative of longitudinal acceleration and said third input terminal of said first combining circuit means;

means for energizing said second switching means connected to said output terminal of said OR gate;

integrator circuit means having an input terminal and an output terminal, said output terminal coupled to said second input terminal of said fourth combining circuit means;

fourth amplifier circuit means having an input terminal and an output terminal, said input terminal connected to said output terminal of said fourth combining circuit means;

fifth amplifier circuit means having an input terminal and an output terminal, said input terminal connected to said first input terminal of said first combining circuit means;

third switching means coupled between said input terminal of said integrator circuit and said output terminal of said fifth or fourth amplifier circuit means in response to the output signals at said output terminal of said OR gate; and, sixth amplifier circuit means having an input terminal coupled to said output terminal of said first combining circuit means and further having an output terminal for providing said throttle command signal.

3. A Mach hold control circuit having capture and track submodes of operation and including an output terminal for providing a throttle rate command signal to a throttle servo in an aircraft autothrottle system, said Mach hold circuit comprising:

first means for providing a signal representative of Mach error;

second means for providing a signal representative of average EPR;

third means for providing a signal representative of longitudinal acceleration of the aircraft;

amplifier circuit means connected to said output terminal; said amplifier means having an input terminal;

combining circuit means coupled between said first, second and third means and said amplifier circuit means; and, a logic circuit connected in circuit upstream from said combining circuit means for providing switching of said Mach hold control circuit between said capture and track submodes; said logic circuit comprising an AND gate responsive to a Mach hold system engage signal, an EPR override signal, a throttle lever aft limit position sensing switch, and a low speed protection signal, said AND gate having an output terminal;

a time delay circuit connected to said output terminal of said AND gate for providing a first logic output signal;

an OR gate having a first input terminal responsive to said first logic output signal, said OR gate having a second input terminal, and an output terminal for providing a second logic output signal;

said second input terminal coupled through combining circuit means and an absolute value circuit to said first means for providing a signal representative of Mach error.

* * * * *